Dec. 8, 1959   M. K. LAUFER ET AL   2,916,606
INSTRUMENT LIGHTING FIXTURES
Filed May 18, 1956   3 Sheets-Sheet 1

INVENTORS
MAURICE K. LAUFER
WILLIAM D. HALL

BY Cushman, Darby & Cushman
ATTORNEYS

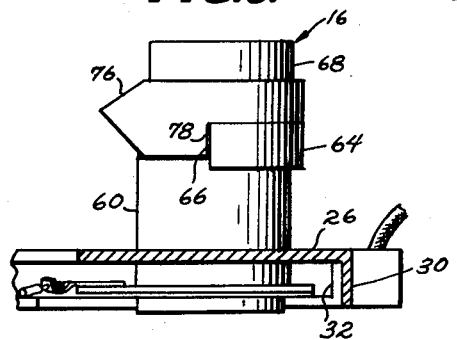
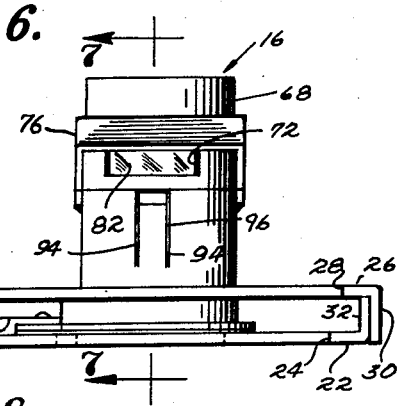
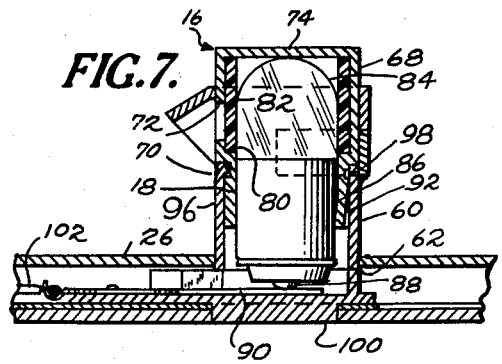
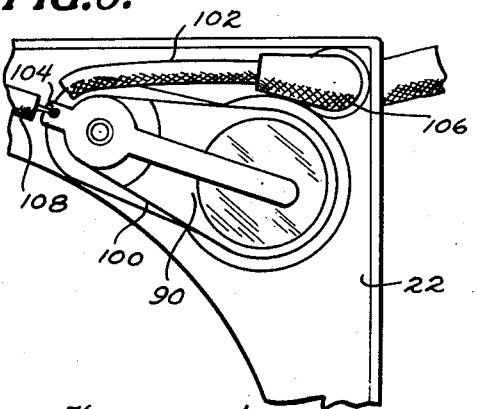
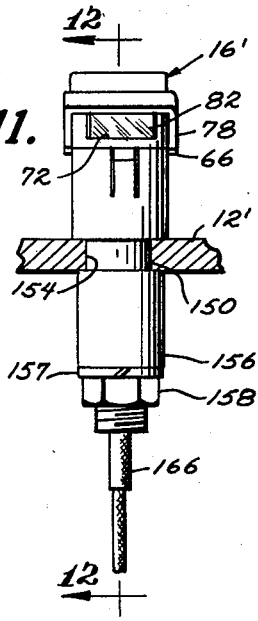
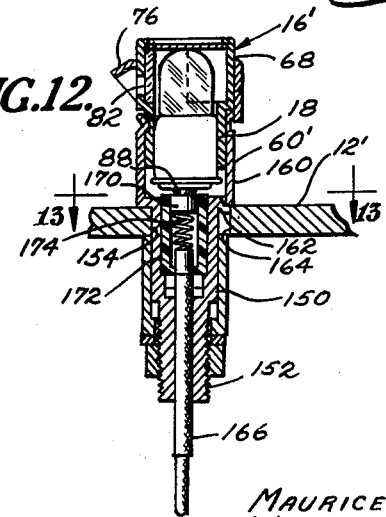

Dec. 8, 1959    M. K. LAUFER ET AL    2,916,606
INSTRUMENT LIGHTING FIXTURES
Filed May 18, 1956    3 Sheets-Sheet 3

INVENTORS
MAURICE K. LAUFER
WILLIAM D. HALL
BY Cushman, Darby & Cushman
ATTORNEYS United States Patent Office 2,916,606
Patented Dec. 8, 1959

2,916,606

INSTRUMENT LIGHTING FIXTURES

Maurice K. Laufer and William D. Hall, Urbana, Ohio, assignors to Grimes Manufacturing Company, Urbana, Ohio, a corporation of Ohio Application May 18, 1956, Serial No. 585,800

16 Claims. (Cl. 240—2.1)

The present invention relates to an instrument lighting fixture, and, more particularly, to a light assembly and lighting fixture particularly adapted for use in vehicular instrument panels, such as in aircraft or the like.

In instrument panels of aircraft or the like where there is usually mounted a plurality of individual instruments, it is necessary to light the instruments in such a manner that the reflection of light therefrom does not bother the pilot. The light being directed onto the instruments must not be diffused throughout the cockpit to thereby prevent the pilot from having proper vision out of the aircraft windows at night. Further, the light must be so directed on each instrument that when the pilot looks at the instrument, he will be able to read the instrument without causing any contraction of the pupils of his eyes. The problem has been alleviated to some extent in that it has been found advantageous to individually light each instrument, with the lights positioned as close as possible to the instrument and the rays of light directed into the instrument and shielded from the observer's eyes. Light assemblies have been provided directly on the instruments and, further, where no lights have been provided on the instruments, instrument shields or covers containing light assemblies are provided for each instrument mounted in the instrument panel, such as disclosed in the United States Patent No. 2,710,910, issued June 14, 1955, to Warren G. Grimes.

The present invention is an improvement in light assemblies adapted for use with an instrument panel and lighting fixtures for use with an individual instrument.

An object of the present invention is to provide a lighting fixture for use with individual instruments which is of extremely small size, fits the face of the instrument, and permits close instrument spacing.

Another object of the present invention is to provide a lighting fixture with light assemblies thereon, the light assemblies being so arranged that when a lamp is replaced, the direction of the light-emitting slot of the assembly cannot be affected.

Another object of the present invention is to provide a lighting fixture adapted for use with individual instruments, the lighting fixture being removable from the panel without the necessity of removing the instrument from the panel.

Still another object of the present invention is to provide a lighting fixture adapted for use with an individual instrument, the lighting fixture including light assemblies for separately lighting different portions of the face of the instrument.

A still further object of the present invention is to provide a light assembly including a lamp bulb having its filament axis mounted perpendicular to and away from the face of the instrument, the light assembly providing means for directing light rays inwardly at an angle to the instrument face.

Still another object of the present invention is to provide a lighting fixture utilizing light assemblies having small "peanut"-sized lamp bulbs, the contacts for the lamp bulbs when installed in the light assembly being positive.

A further object of the present invention is to provide a light assembly utilizing extremely small lamp bulbs, the lamp bulbs, when removed, being contained in a portion of the light assembly which is detachable from the remainder of the light assembly, thereby providing easy handling of the extremely small lamp bulbs.

These and other objects of the invention will become more apparent in the following specification, claims and drawings in which:

Figure 5 is an enlarged side elevational view of the light assembly of the lighting fixture disclosed in Figure 1, portions of the lighting fixture being in section;

Figure 6 is a front elevational view of the light assembly of Figure 5;

Figure 7 is a sectional view taken on the line 7—7 of Figure 6;

Figure 8 is an enlarged fragmentary elevational view of the lighting fixture of Figure 1 with the front plate removed and light assembly removed;

Figure 11 is a front elevational view of the light assembly of the present invention when attached directly to the instruent panel; and Figure 12 is a sectional view taken on the line 12—12 of Figure 11.

Figure 1:
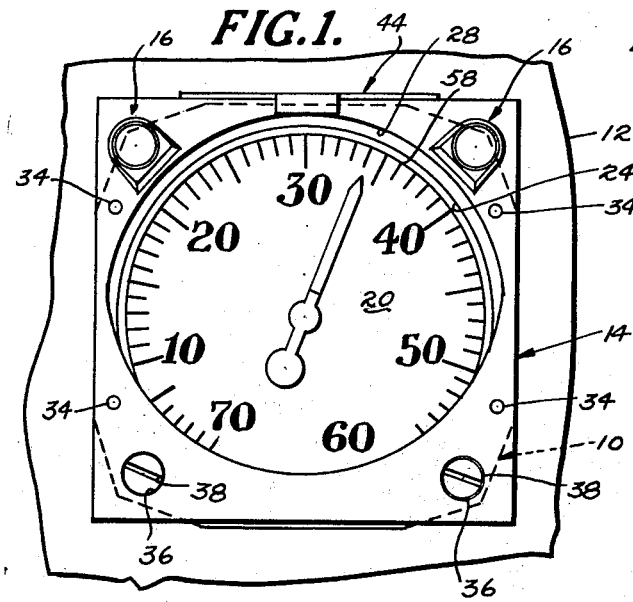
Figure 1 is a front elevational view of the lighting fixture of the present invention mounted on an instrument in an instrument panel.

Referring now to the drawings wherein like reference numerals or characters represent like or similar parts throughout the figures, there is shown in Figure 1 the lighting fixture of the present invention mounted over an instrument 10 carried in an instrument panel 12 of a vehicle such as aircraft. The lighting fixture includes a cover member generally designated 14 and light assemblies generally designated 16 mounted in each upper corner of the cover member. The light assemblies 16 each contain a lamp bulb 18, as best shown in Figure 7, the lamp bulb emitting rays from the light assembly downwardly at an angle to and inwardly toward the dial 20 of the instrument, as shown by the broken lines in Figure 2.

Cover member 14 includes a back plate 22 having an aperture 24 (Figures 1 and 3) which fits substantially around the periphery of the instrument dial 20 and a front plate 26 which also has an aperture 28 which fits around the periphery of the dial 20 of instrument 10. The front plate 26 is spaced from the back plate 22 and is provided with a flanged outer edge 30 into which a flanged outer edge 32 of back plate 22 telescopes, as best shown in Figures 5 and 6. Suitable rivets 34 are provided adjacent each of the corners of the cover member 14 for holding the front plate 26 rigid with respect to back plate 22.

The lower corners of cover member 14 are provided with holes 36 therethrough and are adapted to receive bolts 38 which extend through the instrument flange 40 and instrument panel 12. The inner ends of bolts 38 receive nuts behind the instrument panel, the nuts clamping the instrument and the cover member to the instrument panel.

Figure 2:
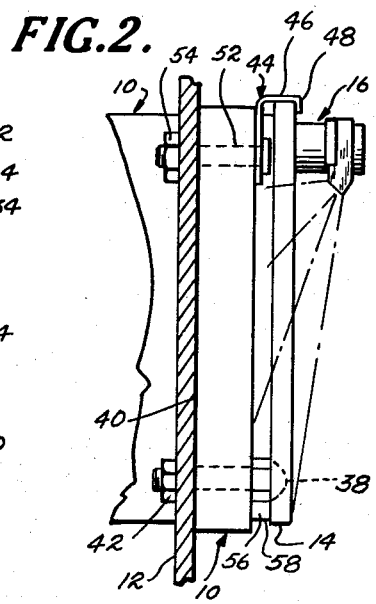
Figure 2 is a side elevational view of the lighting fixture in Figure 1, the instrument panel being shown in section.
Figure 4:
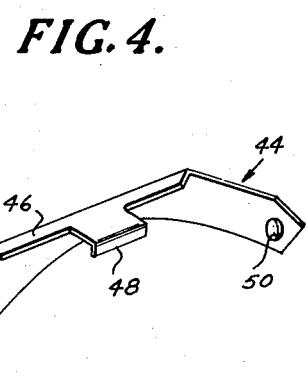
Figure 4 is a perspective view of the clamping bracket used with the lighting fixture shown in Figures 1 and 2.

A bracket 44 having an outwardly extending flange 46 and a downwardly extending lip 48 spaced from the body of the bracket is detachably secured to the instrument for holding the upper portion of cover member 14 to the instrument. As best shown in Figures 2 and 4, bracket 44 is provided with holes 50 at its outer ends, the holes adapted to receive bolts 52 which extend through the flange 40 of instrument 10 and the instrument panel 12. Nuts 54 are threaded onto the inner ends of bolts 52 to retain the upper portion of instrument 10 and bracket 44 in place in the aperture of the instrument panel.

As is best shown in Figures 1 and 2, the instrument 10, which is normally mounted on the instrument panel 12 usually by four bolts fitting through suitable holes provided at the corners of its flange 40, is mounted in the instrument panel with the bracket 44 (Figure 4) secured to its upper two bolts. The lower bolts are not inserted to secure the instrument to the instrument panel until the cover member 14 is positioned on the instrument. After the instrument is secured in place with the bracket, the upper edge of cover member 14 is slipped under the lip 48 of bracket 44 and the lower portion of cover member 14 will then have its bolt apertures 36 aligned with the lower apertures in the flange of the instrument. The lower bolts 38 are then positioned through the apertures 36 in the cover member 14, the flange in the instrument, and the instrument panel so as to positively retain the cover member on the instrument panel. It will be noted that when it is desired to remove the cover member, it is not necessary to remove the instrument from the instrument panel as the lower bolt assemblies are removed and the cover member can be slipped out from under the lip 48 of bracket 44. The upper bolts 52 will still retain the instrument in position on the instrument panel.

Figure 3:
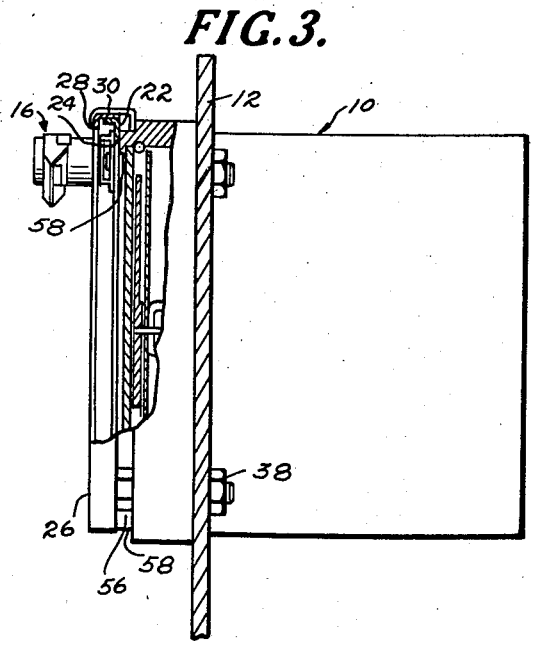
Figure 3 is a view similar to Figure 2 but showing the lighting fixture partly in vertical section.

Referring now to Figures 2 and 3, the cover member 14 is provided with a boss or spacer 56 on its back plate 22 adjacent each of the holes 36. Spacers 56 are provided on the cover member 14 when the instrument is of the front-mounted type, that is, when the flange 10 of the instrument is positioned forward of the instrument panel 12. When the instrument is mounted in this position, as shown in Figures 2 and 3, the back plate 22 of the cover member 14 will fit flush against the instrument bezel 58. On the other hand, if the instrument is rear-mounted, that is, the flange 40 of the instrument abuts behind the instrument panel 12, then it is not necessary to provide the spacer 56 as the back plate 22 of cover member 14 will fit flush against the instrument panel 12.

Referring now to Figures 5 through 8, inclusive, the light assembly 16 mounted on the front plate 26 of cover member 14 includes a tubular socket member 60 extending outwardly from the front plate and rigidly secured thereto by peening or the like, as indicated at 62. The socket member 60 is provided with an arcuate projection 64 at its outer end, the arcuate projection having longitudinally extending shoulders 66. A tubular collar 68 closed at one end, as indicated at 74, is provided with a reduced portion 70 which is adapted to telescope into socket member 60. The collar member 68 is provided with a light-transmitting slot or aperture 72 in its wall adjacent its closed end 74. Provided around the collar member 68 adjacent the light-transmitting slot 72 is a hood element 76 which intercepts the rays of light emitted from lamp bulb 18 except those that are progressing downwardly and inwardly toward the dial or face 20 of instrument 10. The hood element 76, which is integral with collar member 68, is provided with longitudinally extending shoulders 78, the shoulders 78 abutting against the shoulders 66 when the collar member 68 is telescoped into the socket member 60. By providing the shoulders 66 and 78 on socket and collar members 60 and 68 respectively, the light-transmitting slot 72 will always be properly aligned to direct the rays toward the instrument 10 when the collar member 68 and its lamp bulb 18 are inserted into place.

Referring specifically to Figure 7, collar member 68 at its upper end is enlarged over the reduced portion 70 and provides an enlarged internal recess 80 into which a light-transmitting filter element 82 is positioned. The filter element 82 is usually made of a red transparent, translucent plastic material so that the light emitted from the light assembly is a soft red light which does not affect the vision of the pilot, yet permits him to instantly read the instrument at night.

Lamp bulb 18, which is a peanut-sized bulb, is frictionally held in collar member 68 with its filament end 84 extending perpendicular of the instrument face 20 and away from the front plate 26 of cover member 14. As is shown in Figure 7, the filament end 84 of lamp bulb 18 is positioned adjacent the slot 72 in the collar member 68. Lamp bulb 18 is provided with a cylindrical contact 86 and a center contact 88. The cylindrical contact 86 engages the inner surface of the wall of collar 68, whereas the center contact 88 engages a center contact terminal 90, as will be explained in more detail later in the specification. To assist in retaining lamp bulb 18 frictionally in the collar member 68, the wall of the collar member adjacent its open end is provided with an inwardly extending tongue 92. The tongue 92 bears tightly against the cylindrical contact 86 when bulb 18 is telescoped into the collar member 68 and not only holds the bulb in place but also provides a positive ground to and through the collar member.

Socket member 60 is provided with two longitudinal cuts in its wall, as indicated at 94, the cuts defining a tongue element 96 as best shown in Figure 6. Tongue element 96 extends inwardly of the socket member 60 slightly and its end is adapted to be received in a circumferential groove 98 (Figure 7) provided on the outer surface of the wall of reduced portion 70 of collar member 68. The tongue 96 helps to positively retain the collar member 68 in the socket member 60 by a snap fit and also positively grounds the collar member to the socket member.

Fixedly mounted between the front and back plates 26 and 22 respectively of cover member 14 beneath the opening thereto of socket member 60, is provided a plastic insulator element 100. The insulator element 100 is adapted to support the center lamp contact terminal 90, the terminal being a spring strip adapted to engage the center contact 88, as best shown in Figure 7. The outer end of center contact terminal 90 is attached to a wire 102, as indicated at 104, the wire 102 passing through an aperture 106 in the back plate 22. Wire 102 leads through the instrument panel to a suitable source of supply of electric power. Since there are two lamp assemblies 16 mounted on the outer corners of cover member 14, a second wire 108 is attached to the contact 90 at the point of connection 104. The wire 108 leads to the center contact terminal of the other lamp assembly which is similar to the contact terminal 90 mounted in the insulator element 100.

The ground for the lamp bulb 18 is through its cylindrical contact 86, the wall 70 of collar member 68, the socket member 60, cover member 14, instrument 10 and instrument panel 12. As is the usual practice, the instrument panel 12 is grounded to the frame of the aircraft.

By having the light assemblies 16 connected in parallel, should one lamp bulb 18 burn out, the other will still be available to light the instrument. Further, by having the lamp bulb 18 supported in the collar member 68, should a lamp bulb burn out, the pilot may easily remove the same by merely removing the collar member which supports the bulb and replacing the bulb in the collar member. The collar member can then be put back into the socket member and because of the co-acting shoulders 78 and 66 on the collar member and socket respectively, the collar member will be properly aligned to emit light in the proper direction.

Figure 9:
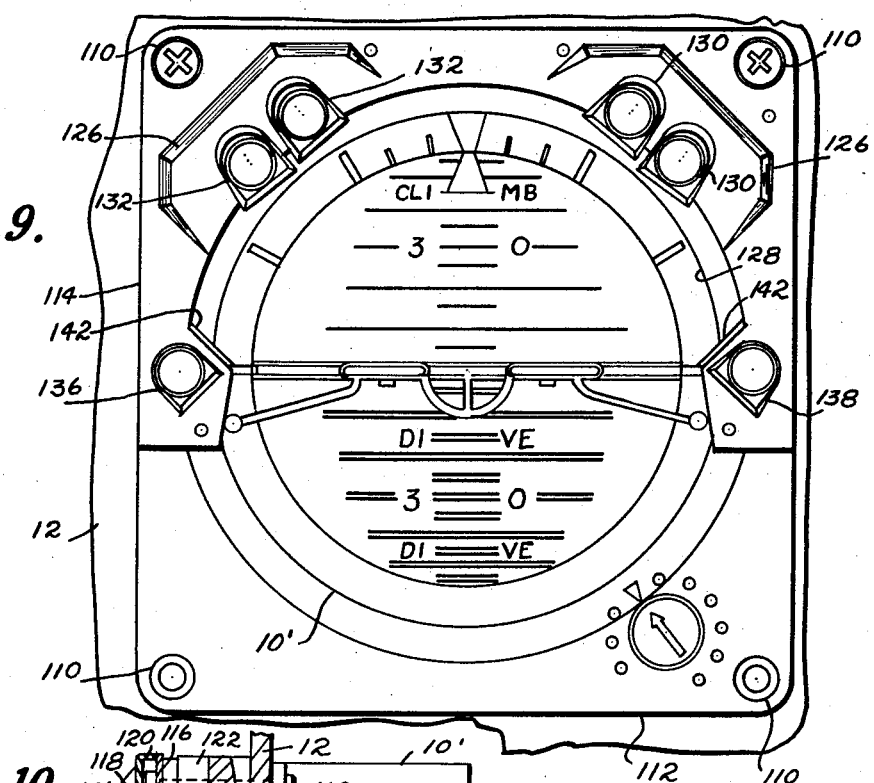
Figure 9 is a front elevational view of a modified form of lighting fixture.
Figure 10:
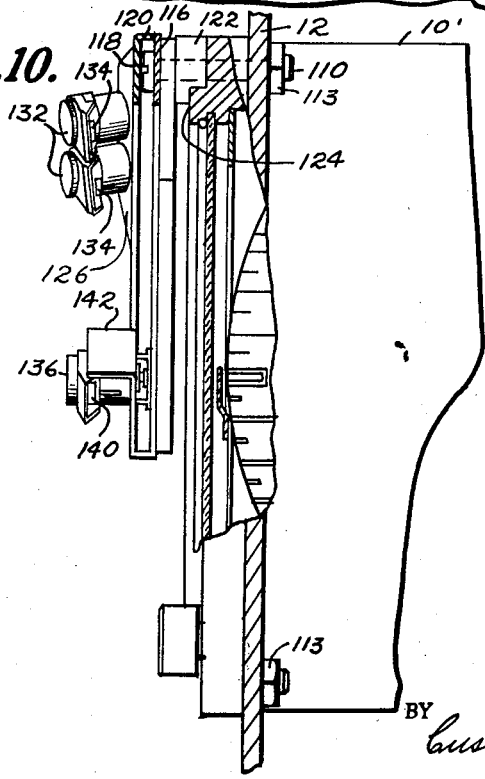
Figure 10 is a side view of the lighting fixture disclosed in Figure 9, parts of the lighting fixture being in vertical section.

A modification of the instrument lighting fixture of the present invention is disclosed in Figures 9 and 10. In this modification, the instrument panel 12 is provided with an instrument 10' of the type having two indicator means provided thereon. It will be noted that the upper portion of the instrument not only indicates the degree of climb but also indicates the bank of the aircraft. On the other hand, the lower portion of the instrument indicates the degree of dive. In aircraft, there are many types of instruments wherein a different indicator means is provided in the upper portion of the instrument than in the lower portion, the one shown in the drawings being disclosed merely for the purpose of illustration.

The instrument 10' is front-mounted on the instrument panel 12 by the usual bolts passing through the corners of the instrument flange 112 and the instrument panel 12. Suitable nuts 113 are applied behind the instrument panel 12 on bolts 110 to clamp the instrument in place. In the modification disclosed in Figure 9 a cover member 114 which fits around the periphery of the upper portion of the instrument is mounted on the instrument, utilizing the upper bolts 110 which hold the instrument in the instrument panel. Cover member 114 includes a back plate 116 rigidly secured to a front plate 118, the front plate being spaced from the back plate by an outer peripheral flange 120. Suitable spacers 122 are adapted to properly space the back plate 116 with respect to the face of the instrument. In other words, the spacers 122 mounted on the upper corners of the back plate are adapted to fit into the bezel 124 of the instrument 10'.

Each of the upper corners of the front plate 118 are provided with raised portions 126 which are beveled outwardly away from the inner edge 128 of the cover member. Mounted on each of the projections 126 are a pair of light assemblies 130 and 132 which have their light-transmitting apertures 134 directed diametrically opposite inwardly toward the upper portion of the face of the instrument 10'. The lower corners of cover member 114, which are positioned substantially on the horizontal axis of the instrument dial or face, are each provided with a light assembly 136 and 138 and their light-transmitting slot 140 directed diametrically opposite downwardly toward the lower portion of the dial of instrument 10'.

A baffle projection 142 extending outwardly from the front plate 118 adjacent each of the light assemblies 136 and 138 prevent light emitting from these light assemblies from reaching the upper portion of the face of the instrument. Each of the light assemblies 130, 132, 136 and 138 are substantially similar in construction to the light assemblies previously described in connection with Figures 1 through 8 inclusive and their detailed description is not repeated. The light assemblies are connected in parallel just as the light assemblies of Figures 1 through 8 inclusive and they are each provided with means for orienting the collar member with the socket so that the light-transmitting slot is properly aligned with respect to the face of the instrument.

Referring now to Figures 11 and 12, the light assembly 16' of the present invention is shown mounted directly on the instrument panel 12. In this modification the light assembly can be mounted on an instrument panel at any position desired adjacent an instrument or other equipment, the light-transmitting slot 72 being so oriented as to direct the light rays onto the face of the instrument.

The light assembly 16' includes a tubular socket member 60' which is provided with a reduced end portion 150 threaded at its end as indicated at 152. The reduced portion 150 is adapted to fit through an aperture 154 in the instrument panel and a sleeve 156 fits over the reduced portion and abuts against the instrument panel 12' to clamp the socket member 60' to the instrument panel when a nut 158 is threaded onto the threads 152. A lock nut 157 is provided between nut 158 and sleeve 156 to prevent the nut from becoming loose.

The tubular collar member 68' with the light-transmitting slot 72 and the filter element 82 is identical with the previously described collar member. The collar member 68' includes the shoulders 78 which abut against the shoulders 66 provided on the socket member 60 so as to orient the collar member with respect to the socket member and prevent relative rotation therebetween.

In order to prevent rotation of the socket member 60' with respect to the instrument panel 12', the socket member 60' at its junction of the reduced portion 150 and its bulb-receiving portion 160 is provided with a radially extending lug 162 pressed out from its wall, as shown in Figure 12. Lug 162 is adapted to fit into a keyway 164 provided in the aperture 154 of the instrument panel 12'. The lug prevents relative rotation of the socket member with respect to the instrument panel and since the collar member is provided with shoulders 66 and 78, the light-transmitting slot 72 will always be aligned in its predetermined direction when the collar member is telescoped into the socket member.

A wire 166 extending upwardly through the tubular socket member 60' is provided with a terminal 170, the terminal 170 being adapted to engage the center contact 88 of lamp bulb 18. A collar member 172 is provided within the reduced portion 150 of socket member 60', the collar 172 being made of an insulating material and insulating the terminal 170 from the walls of the socket member. As shown, the terminal 170 may be spring-urged toward the contact 88 by means of the coil spring 174. Wire 166 is connected to a suitable source of supply of electric power. The ground for the lamp bulb is through its cylindrical contact 86, the wall of collar member 68, the socket member 60', and the instrument panel 12'.

The terminology used in the specification is for the purpose of description and not for limitation, the scope of the invention being defined in the claims.

We claim:

1. In an instrument light assembly adapted for use with an instrument panel: a tubular socket member; means to fixedly attach said tubular socket member to the instrument panel; a tubular collar member having a portion of reduced outside diameter for telescoping within said tubular socket member and a second portion of enlarged outside diameter for abutting against the end of said tubular socket member, said tubular collar member having an open end on its reduced portion and a closed end on its enlarged portion, said tubular collar member including a light transmitting slot in the wall of its enlarged portion adjacent the closed end; means to positively align said tubular collar member and its light transmitting slot with respect to said tubular socket member when inserted in the same, said aligning means including a rigid arcuate projection carried on said socket member and having a pair of longitudinally extending shoulders and a second rigid projection carried on said collar member and having a pair of longitudinally extending shoulders, said first pair of shoulders abutting respectively with said second pair of shoulders on axial planes through said collar and socket members when the same are telescoped and thereby preventing rotation therebetween; a lamp bulb having a center contact and a cylindrical contact, said lamp bulb being detachably supported in said tubular collar member with its filament end adjacent said slot and its cylindrical contact in engagement with the wall of the collar member; and a lamp center contact terminal mounted centrally of and insulated from said socket member, said terminal engaging said center contact of said lamp bulb when said collar member is telescoped into said socket member.

2. An instrument light assembly of the character described in claim 1 wherein said socket member includes a tongue element in its wall, said tongue element frictionally engaging the wall of said collar member to detachably retain said collar member in telescoping relationship with said socket member.

3. An instrument light assembly of the character described in claim 2 wherein said collar member is inserted into said socket member and wherein the outer surface of the reduced portion of the wall of said collar member is provided with a circumferential groove for receiving said tongue element.

4. An instrument light assembly of the character described in claim 1 wherein said collar member includes a tongue element integral in its wall and extending inwardly toward its longitudinal axis, said tongue element frictionally engaging and detachably retaining said light bulb in said collar member.

5. An instrument light assembly of the character described in claim 2 wherein said socket member opposite the end supporting said collar member includes a portion of reduced diameter externally threaded at its end, said portion of said socket member being adapted to fit through an aperture provided in the instrument panel, said means for fixedly attaching said socket member to the instrument panel including a tubular sleeve element slidable on the reduced portion of said socket member and a nut threaded onto the threaded end of said socket member, said nut bearing against said sleeve so as to clamp the instrument panel between the sleeve and a shoulder formed between the reduced portion and the remaining portion of said socket member.

6. An instrument light assembly of the character described in claim 5 wherein the reduced portion of said socket member is provided with a radially extending lug, said lug adapted to be received in a keyway provided in the instrument panel adjacent the aperture therein.

7. In combination: an instrument panel having an aperture therein; a keyway in said instrument panel adjacent the aperture; a light assembly comprising a tubular socket member having a portion thereof of reduced diameter; a lug positioned on said socket member adjacent the reduced portion thereof, said socket member being adapted to have its reduced portion fit into the aperture of the instrument panel with its lug in said keyway to prevent rotation of the socket member with respect to the instrument panel, means to detachably secure said socket to the instrument panel when inserted in the aperture, a tubular collar member having a portion of reduced outside diameter for telescoping within said tubular socket member and a second portion of enlarged outside diameter for abutting against the end of said tubular socket member, said tubular collar member having an open end on its reduced portion and a closed end on its enlarged portion, said tubular collar member including a light transmitting slot in its wall of its enlarged portion adjacent the closed end, means to positively align said tubular collar member and its light transmitting slot with respect to said tubular socket member when inserted in the same, said aligning means including a rigid arcuate projection carried on said socket member and having a pair of longitudinally extending shoulders and a second rigid projection carried on said collar member and having a pair of longitudinally extending shoulders, said first pair of shoulders abutting respectively with said second pair of shoulders on axial planes through said collar and socket members when the same are telescoped and thereby preventing rotation therebetween, a lamp bulb having a center contact and a cylindrical contact, said lamp bulb being supported in said collar member with its filament end adjacent said slot and its cylindrical contact in engagement with the wall of said collar member, a lamp center contact terminal mounted centrally of and insulated from said socket member, said terminal engaging said center contact of said lamp bulb when said collar member is telescoped into said socket member.

8. An individual lighting device for each instrument mounted in an instrument panel comprising: a cover member adapted to fit around at least a portion of the periphery of the instrument; means for detachably mounting said cover member to the instrument panel; at least one light assembly mounted on said cover member to extend outwardly away from the instrument, said light assembly comprising a tubular socket member fixedly attached to said cover member, a tubular collar member having a portion of reduced outside diameter for telescoping within said tubular socket member and a second portion of enlarged outside diameter for abutting against the end of said tubular socket member, said tubular collar member having an open end on its reduced portion and a closed end on its enlarged portion, said tubular collar member including a light transmitting slot in its wall of its enlarged portion adjacent the closed end, means to positively align said tubular collar member and its light transmitting slot with respect to said tubular socket member when inserted in the same, said aligning means including a rigid arcuate projection carried on said socket member and having a pair of longitudinally extending shoulders and a second rigid projection carried on said collar member and having a pair of longitudinally extending shoulders, said first pair of shoulders abutting respectively with said second pair of shoulders on axial planes through said collar and socket members when the same are telescoped and thereby preventing rotation therebetween; a lamp bulb having a center contact and a cylindrical contact, said lamp bulb being detachably supported in said tubular collar member with its filament end adjacent said slot and its cylindrical contact in engagement with the wall of the collar member; a lamp center contact terminal carried on said cover member and positioned centrally of said tubular socket member, said center contact terminal being insulated from said cover member and said socket member and engaging the center contact of said lamp bulb; and current conducting means connected to said terminal and adapted to be connected to a source of power.

9. A lighting device of the character described in claim 8 wherein the collar member of said light assembly is provided with a hood extending outwardly from its wall adjacent the slot therein to thereby shield the light rays from an observer of the instrument.

10. A lighting device of the character described in claim 8 wherein said cover member fits around the periphery of the instrument and includes a plurality of said light assemblies, each light assembly being arranged so that its light-transmitting slot directs light toward the instrument.

11. A lighting device of the character described in claim 8 wherein said cover member fits around the upper peripheral portion of the instrument and includes a plurality of light assemblies arranged to have their light-transmitting slots direct light rays toward the upper portion of the instrument, and a pair of oppositely disposed light assemblies being arranged to have their light-transmitting slots direct light rays toward the lower portion of the instrument, a shield element extending outwardly from said cover member adjacent the upper side of each of said pairs of light assemblies, said shield element shielding light from being transmitted to the upper portion of the instrument from said pairs of lamp assemblies.

12. A lighting device of the character described in claim 8 wherein said cover member extends around the periphery of the instrument and wherein said means for detachably mounting said cover member to the instrument panel includes a bracket adapted to be attached to the upper portion of the instrument, said bracket having a flanged portion extending outwardly of the instrument and a lip portion extending downwardly from the flange, the upper portion of said cover member being adapted to fit under the flange and lip of said bracket, and bolt and nut means for attaching the lower portion of said cover member to the instrument and instrument panel.

13. In combination, an apertured instrument panel, an instrument mounted in an aperture of the instrument panel, means to detachably secure the upper and lower portion of said instrument to the instrument panel when the instrument is mounted in the aperture, a bracket element supported by the means securing the upper portion of said instrument, said bracket element including a flange extending outwardly from the face of said instrument and a lip portion extending downwardly from said flange in spaced relationship with the face of said instrument, a lighting device including a cover member adapted to fit around the periphery of the face of said instrument, and light assemblies mounted on said cover member for directing light onto the face of said instrument, the upper portion of said cover member being retained by said bracket and the lower portion of said cover being secured to said instrument and instrument panel by said means for securing the lower portion of said instrument to said instrument panel.

14. In combination: an instrument panel; an instrument mounted on said instrument panel, said instrument having one indicator means in the upper portion of its face and another indicator means in the lower portion of its face; a lighting device comprising a cover member adapted to fit around at least the upper peripheral portion of the face of the instrument, means for detachably mounting said cover member on said instrument, a plurality of light assemblies mounted on the upper portion of said cover member, said plurality of light assemblies each directing light rays toward the upper portion of the face of said instrument, a pair of light assemblies mounted in spaced relationship with each other on said cover member approximately on a horizontal diametrical line through the instrument face, said pair of said light assemblies each directing light rays toward the lower portion of the face of said instrument, each of said plurality of light assemblies and said pair of light assemblies including a tubular socket member fixedly connected to said cover member; a tubular collar member having a portion of reduced outside diameter for telescoping within said tubular socket member and a second portion of an enlarged outside diameter for abutting against the end of said tubular socket member, said tubular collar member having an open end on its reduced portion and a closed end on its enlarged portion, said tubular collar member including a light transmitting slot in its wall of its enlarged portion adjacent the closed end, means to positively align said tubular collar member in its light transmitting slot with respect to said tubular socket member when inserted in the same, said aligning means including a rigid arcuate projection carried on said socket member and having a pair of longitudinally extending shoulders and a second rigid projection carried on said collar member and having a pair of longitudinally extending shoulders, said first pair of shoulders abutting respectively with said second pair of shoulders on axial planes through said collar and socket members when the same are telescoped and thereby preventing rotation therebetween; a lamp bulb having a center contact and a cylindrical contact, said lamp bulb being detachably supported in said tubular collar member with its filament end adjacent said slot and its cylindrical contact in engagement with the wall of the collar member; a lamp center contact terminal mounted centrally of and insulated from said socket member and said cover member, said terminal engaging said center contact of said lamp bulb when said collar member is telescoped into said collar member; and means on said cover member to shield light rays being transmitted by said pair of light assemblies from the upper portion of the face of said instrument.

15. The combination of claim 14 wherein said last mentioned means includes a light-impervious shield element positioned between each of said pair of light assemblies and the upper portion of the face of said instrument.

16. The combination of claim 14 wherein said pair of light assemblies each has a lamp bulb with its filament axis extending outwardly from said cover member perpendicular to the face of the instrument, and wherein said last mentioned means includes a light-impervious shield element projecting outwardly from said cover member between each of said pair of light assemblies and the upper portion of said instrument.

References Cited in the file of this patent

UNITED STATES PATENTS

| | | |
|---|---|---|
| 1,034,936 | Stender | Aug. 6, 1912 |
| 1,263,075 | Knauff | Apr. 16, 1918 |
| 1,644,287 | Spencer | Oct. 4, 1927 |
| 1,905,818 | Douglas | Apr. 25, 1933 |
| 2,202,155 | Kollsman | May 28, 1940 |
| 2,214,209 | Triplett | Sept. 10, 1940 |
| 2,677,045 | MacArthur | Apr. 27, 1954 |
| 2,710,910 | Grimes | June 14, 1955 |
| 2,723,342 | Neugass | Nov. 8, 1955 |